United States Patent
Hoganson

(10) Patent No.: US 9,139,383 B2
(45) Date of Patent: Sep. 22, 2015

(54) CONTROL OF PNEUMATIC CARRIER SYSTEM BASED ON CARRIER OR PAYLOAD IDENTIFICATION

(71) Applicant: TRANSLOGIC CORPORATION, Denver, CO (US)

(72) Inventor: Kenneth Michael Hoganson, Aurora, CO (US)

(73) Assignee: TRANSLOGIC CORPORATION, Denver, CO (US)

( * ) Notice: Subject to any disclaimer, the term of this patent is extended or adjusted under 35 U.S.C. 154(b) by 0 days.

(21) Appl. No.: 14/024,907

(22) Filed: Sep. 12, 2013

(65) Prior Publication Data

US 2014/0081448 A1     Mar. 20, 2014

Related U.S. Application Data

(60) Provisional application No. 61/700,383, filed on Sep. 13, 2012.

(51) Int. Cl.
    *G06F 7/00*          (2006.01)
    *B65G 51/36*       (2006.01)
    *B65G 51/44*       (2006.01)

(52) U.S. Cl.
    CPC ............... *B65G 51/36* (2013.01); *B65G 51/44* (2013.01)

(58) Field of Classification Search
    USPC ........................................................ 700/230
    See application file for complete search history.

(56) References Cited

U.S. PATENT DOCUMENTS

| | | | |
|---|---|---|---|
| 2,043,293 | A | 6/1936 | Jennings |
| 2,679,990 | A | 6/1954 | Mathzeit et al. |
| 2,710,728 | A | 6/1955 | Halpern |
| 2,773,658 | A | 12/1956 | Van Otteren et al. |
| 2,797,057 | A | 6/1957 | Sindzinski et al. |
| 2,815,182 | A | 12/1957 | Mittag et al. |
| 2,850,249 | A | 9/1958 | Uderstadt |
| 2,865,578 | A | 12/1958 | Hennessy |

(Continued)

FOREIGN PATENT DOCUMENTS

EP     2082980 A1     1/2009

OTHER PUBLICATIONS

Aerocom GmbH & Co., Technical Bulletin: Empty Carrier Return Unit AC 3000 (CRU) Technical Information Manual, Mar. 4, 1996.

(Continued)

*Primary Examiner* — Gene Crawford
*Assistant Examiner* — Kyle Logan
(74) *Attorney, Agent, or Firm* — Marsh Fischmann & Breyfogle LLP

(57) ABSTRACT

A system and method provides for controlling a pneumatic carrier system based on identification information read from a carrier or a payload of the carrier. Each carrier or payload which is to be employed within the system includes an identification device such as a radio frequency identification (RFID) chip which has stored thereon information for the carrier or payload. Positioned throughout the system are communications devices such as antennas and readers which are employed to read and/or write identification information on the identification device. Based on reading the identification device at locations within the system, the operation of the system is altered.

10 Claims, 13 Drawing Sheets

(56) References Cited

U.S. PATENT DOCUMENTS

| | | |
|---|---|---|
| 2,893,660 A | 7/1959 | Cook et al. |
| 2,943,814 A | 7/1960 | Mittag et al. |
| 2,970,791 A | 2/1961 | Hafner et al. |
| 2,997,253 A | 8/1961 | Mittag et al. |
| 3,055,611 A | 9/1962 | Stout et al. |
| 3,055,612 A | 9/1962 | Stout et al. |
| 3,148,845 A | 9/1964 | Buchwald et al. |
| 3,219,989 A | 11/1965 | Kuhrt et al. |
| 3,223,353 A | 12/1965 | Kuhrt et al. |
| 3,236,475 A | 2/1966 | Mach et al. |
| 3,238,515 A | 3/1966 | Schrader et al. |
| 3,265,325 A | 8/1966 | Buchwald et al. |
| 3,295,662 A | 1/1967 | Crosby et al. |
| 3,332,639 A | 7/1967 | Joy |
| 3,333,787 A | 8/1967 | Voitas et al. |
| 3,361,384 A | 1/1968 | Thorburn |
| 3,408,113 A | 10/1968 | Bouladon |
| 3,507,460 A | 4/1970 | Norman et al. |
| 3,627,231 A | 12/1971 | Kalthoff |
| 3,711,038 A | 1/1973 | Van Otteren |
| 3,813,058 A | 5/1974 | Smith et al. |
| 3,817,476 A | 6/1974 | Martin |
| 3,829,042 A | 8/1974 | Torochkov et al. |
| 3,892,372 A | 7/1975 | Hauber |
| 3,951,461 A | 4/1976 | De Feudis |
| 4,037,805 A | 7/1977 | Alexandrov et al. |
| 4,058,274 A | 11/1977 | Hochradel et al. |
| 4,084,770 A | 4/1978 | Warmann |
| 4,256,418 A | 3/1981 | Stangl |
| 4,354,775 A | 10/1982 | Jalas |
| 4,395,164 A | 7/1983 | Beltrop et al. |
| 4,437,797 A | 3/1984 | Kardinal |
| 4,509,123 A | 4/1985 | Vereen |
| 4,516,888 A | 5/1985 | Kardinal |
| 4,529,335 A | 7/1985 | Hilbert et al. |
| 4,563,112 A | 1/1986 | Mokuya et al. |
| 4,630,216 A | 12/1986 | Tyler et al. |
| 4,646,245 A | 2/1987 | Prodel et al. |
| 4,766,547 A | 8/1988 | Modery et al. |
| 4,786,229 A | 11/1988 | Henderson |
| 4,831,540 A | 5/1989 | Hesser |
| 4,941,181 A | 7/1990 | Igarashi et al. |
| 4,958,716 A | 9/1990 | Matsuo et al. |
| 4,971,481 A | 11/1990 | Foreman |
| 4,974,166 A | 11/1990 | Maney et al. |
| 5,038,290 A | 8/1991 | Minami |
| 5,097,421 A | 3/1992 | Maney et al. |
| 5,153,842 A | 10/1992 | Dlugos, Sr. et al. |
| 5,165,826 A | 11/1992 | Egbert |
| 5,166,884 A | 11/1992 | Maney et al. |
| 5,190,428 A | 3/1993 | Bryant et al. |
| 5,196,846 A | 3/1993 | Brockelsby et al. |
| 5,217,328 A | 6/1993 | Lang |
| 5,225,990 A | 7/1993 | Bunce et al. |
| 5,234,292 A | 8/1993 | Lang |
| 5,237,931 A | 8/1993 | Riedl |
| 5,260,694 A | 11/1993 | Remahl |
| 5,267,173 A | 11/1993 | Tanizawa et al. |
| 5,375,691 A | 12/1994 | Wirtz |
| 5,386,364 A | 1/1995 | Tyler |
| 5,434,790 A | 7/1995 | Saka et al. |
| 5,436,611 A | 7/1995 | Arlinghaus, Jr. |
| 5,562,367 A | 10/1996 | Scott |
| 5,655,677 A | 8/1997 | Fratello et al. |
| 5,661,743 A | 8/1997 | Nagai |
| 5,682,820 A | 11/1997 | Arata |
| 5,712,789 A | 1/1998 | Radican |
| 5,735,644 A | 4/1998 | Grosswiller et al. |
| 5,864,485 A | 1/1999 | Hawthorne et al. |
| 5,867,388 A | 2/1999 | Okumura et al. |
| 5,959,568 A | 9/1999 | Woolley |
| 5,966,309 A | 10/1999 | O'Bryan et al. |
| 6,030,152 A | 2/2000 | Steele |
| 6,068,428 A | 5/2000 | Nair et al. |
| 6,076,652 A | 6/2000 | Head, III |
| 6,138,058 A | 10/2000 | Van Antwerp, Jr. et al. |
| 6,146,057 A | 11/2000 | Gromley et al. |
| 6,292,710 B1 | 9/2001 | Bonnet |
| 6,356,802 B1 | 3/2002 | Takehara et al. |
| 6,437,272 B2 | 8/2002 | Tamamoto et al. |
| 6,477,442 B1 * | 11/2002 | Valerino, Sr. ................ 700/213 |
| 6,516,239 B1 | 2/2003 | Madden et al. |
| 6,539,360 B1 | 3/2003 | Kadaba |
| 6,659,693 B1 | 12/2003 | Perkins et al. |
| 6,665,586 B1 | 12/2003 | Ball et al. |
| 6,672,808 B1 | 1/2004 | McIntyre et al. |
| 6,702,150 B2 | 3/2004 | Sumetzberger |
| 6,711,463 B2 | 3/2004 | Tozuka et al. |
| 6,747,560 B2 | 6/2004 | Stevens, III |
| 6,762,382 B1 | 7/2004 | Danelski |
| 6,878,896 B2 | 4/2005 | Braginsky et al. |
| 6,887,358 B2 | 5/2005 | Elger |
| 6,911,910 B2 | 6/2005 | Sansone et al. |
| 6,939,088 B2 | 9/2005 | Farrell |
| 6,950,724 B2 | 9/2005 | Mileaf et al. |
| 6,959,229 B2 | 10/2005 | Eidemiller |
| 7,079,913 B2 | 7/2006 | Kato et al. |
| 7,092,788 B2 | 8/2006 | Brixius et al. |
| 7,104,734 B2 | 9/2006 | Smith et al. |
| 7,136,721 B2 | 11/2006 | Sano et al. |
| 7,151,980 B2 | 12/2006 | You et al. |
| 7,196,627 B2 | 3/2007 | Rommelmann et al. |
| 7,243,002 B1 * | 7/2007 | Hoganson et al. ............ 700/215 |
| 7,328,084 B1 | 2/2008 | Hoganson et al. |
| 7,363,106 B1 | 4/2008 | Hoganson et al. |
| 7,953,515 B2 | 5/2011 | Hoganson et al. |
| 8,447,427 B2 | 5/2013 | Hoganson et al. |
| 8,565,915 B2 | 10/2013 | Dillon |
| 8,596,932 B2 | 12/2013 | Hoganson et al. |
| 8,641,329 B2 | 2/2014 | Barrios |
| 2001/0056311 A1 | 12/2001 | Valerino, Sr. |
| 2009/0311054 A1 * | 12/2009 | Hoganson et al. ............... 406/14 |
| 2011/0097239 A1 | 4/2011 | Schmatz |
| 2011/0186630 A1 * | 8/2011 | Hoganson et al. ............ 235/385 |

OTHER PUBLICATIONS

Manual, Telecom bedrifscommunicatie b.v. buispostsystemen (pneumatic tube systems)-tube-mail systems, Technical Manual Radio Controlled Identifcation, Aug. 24, 1999.

* cited by examiner

CONTROL OF PNEUMATIC CARRIER SYSTEM BASED ON CARRIER OR PAYLOAD IDENTIFICATION

CROSS REFERENCE

This application claims the benefit of the filing date of U.S. Provisional Application No. 61/700,383 having a filing date of Sep. 13, 2012, the entire contents of which is incorporated herein by reference.

FIELD

The presented disclosure relates generally to pneumatic tube carrier systems. More specifically, the disclosure provides systems, apparatuses, and methods for identifying carriers or their contents and controlling system operations based on such identification.

BACKGROUND

Pneumatic tube carrier systems are a well-known means for the automated transport of materials between, for example, an origination location and any one of a plurality of destination locations. A typical system includes a number of pneumatic tubes interconnected in a network to transport carriers between user stations. Various blowers and transfer units provide the force and path control means, respectively, for moving the carriers through and from tube-to-tube within the network. Generally, transfer units move or divert pneumatic carries from a first pneumatic tube to a second pneumatic tube in order to route the pneumatic carrier between locations, or stations, in the network.

The pneumatic tubes forming the network of a pneumatic carrier system may be arranged in any manner that allows the carriers to be transferred between various stations. Generally, systems include a number of individual stations interconnected to the network by a single pneumatic tube. The single pneumatic tube transfers carriers to and from the station under pressure and vacuum.

Large pneumatic carrier systems often include complex network of interconnected tubes. Further, to provide functionality to separate portions of such large systems, most such systems are divided into multiple zones. Typically, each zone includes a set of stations that receive pneumatic pressure and/or vacuum from a common blower. For instance, a transfer unit that receives pressure and/or vacuum from the common blower may connect to each station of such a zone. This transfer unit permits carriers received from a tube connected to one of the stations to be transferred to a tube connected to another of the stations. Different zones are interconnected to permit inter-zone traffic (i.e., transfers from zone to zone). Such inter-zone connections are often made using a single bi-directional tube or using a pair of unidirectional tubes. In this regard, a zone may interconnect directly to one or more zones. Accordingly, to effect transfer of a carrier from a sending station to a receiving station may require passing a carrier through more than one zone and/or multiple inter-zone connections. Often, multiple potential paths or routes exist for transferring a pneumatic carrier between an origination location and a destination location.

SUMMARY

The inventor of the presented inventions has recognized that the ability to identify the location of a carrier and/or its payload as it moves through a pneumatic carrier system allows for providing additional functionality to the system. For instance, many previous pneumatic carrier systems have used a first-in, first-out processing system where each transaction is handled individually from start to finish. Such systems often result in less than optimal use of system hardware. Further the ability to correlate the identification of a carrier or payload with additional records allows for automating various pneumatic carrier system processes.

According to a first aspect, an automated delivery system is provided for use in a pneumatic carrier system. The system and method (i.e., utility) allow a user to place a pneumatic carrier within a pneumatic carrier system and allow the carrier to determine the location of the recipient and automatically deliver the carrier and its payload to a location approximate to the recipient. The utility includes receiving information from a first communication device that reads an identification element or device associated with a pneumatic carrier while that carrier is located at a first user station in a pneumatic carrier system. For instance, upon placing a carrier within a system for delivery, an identification element on the carrier or attached to a payload disposed within the carrier may be read to provide information about the carrier or its contents. More specifically, such an identification device may be read to identify the identity of the intended recipient of the payload. Once the identity of the recipient is identified, a database record may be accessed to identify the location of the intended recipient. Once the location of the intended recipient is identified, the utility may generate a set of control signals to deliver the pneumatic carrier to a user station that is approximate to the location of the recipient. Likewise, the utility may output control signals to transfer components of the pneumatic carrier system to route the carrier through the pneumatic carrier system to the second user station.

In some instances, the recipient may be located at the second user station. However, in other arrangements the payload of the carrier may be delivered to the second user station with additional instructions for delivery to the recipient. In this regard, the utility may further include generating a message for use in subsequent delivery of the payload. For instance, a database entry may be available to an intermediate recipient of the carrier to identify the final recipient of the payload. Likewise, an output may be generated at the second user station or on a personal communications device of a person who will deliver the payload to the final recipient.

In one arrangement, the information is received from an identification device that is interconnected to the payload that is disposed within the pneumatic carrier itself. In such an arrangement, a proximity sensor may be utilized to provide this information. That is, as a line of sight may not exist into the carrier, a proximity sensor such as a magnetic sensor or RFID element may be attached to the payload to allow for remote interrogation.

According to another aspect, a pneumatic system may be controlled in a manner that is dependent upon a type of payload disposed within a pneumatic carrier. In this utility, information may be received from a first communication device that reads an identification device or element that is associated with a payload disposed within a pneumatic carrier located in an originating station of the pneumatic carrier system. This information may be utilized by the utility to access a database entry and identify the type of payload disposed within a pneumatic carrier. Based on the type of the payload, the utility may select one of a plurality of carrier-handling profiles for use in generating a set of routing controls to effect delivery of the pneumatic carrier from an origination station to a destination station.

The plurality of different carrier-handling profiles may include a standard handling profile for payloads that require no specialized handling. In contrast, for payloads that require specialized handling, low-impact carrier-handling profiles may be selected. Such low-impact carrier-handling profiles may include variable-speed handling profiles that reduce the travel velocity of the carrier as it passes through a pneumatic carrier system. Further, such variable-speed handling profiles may include handling profiles that allow for varying the speed of a carrier based on its location within the pneumatic carrier system. For instance, a carrier may be slowed as it passes around bends or curves within a pneumatic carrier system to reduce centripetal forces on the carrier and payload. In a further arrangement, the utility may select a shortest-route handling profile that utilizes the most direct route between an originating station and a destination station. In another arrangement, the utility may select a profile that utilizes the shortest duration handling. That is, a route may be selected that results in the carrier being delivered in the shortest time between an originating station and a destination station. In another arrangement, a prioritized-handling profile may be selected that prioritizes or readjusts the queue of the pneumatic carrier system to handle a higher priority transaction prior to lower-priority transactions.

According to another aspect, a system and method (i.e., utility) is provided that allows for dynamically rerouting a carrier as it passes through a pneumatic carrier system. In this utility, an initial path for a carrier may be generated between an origination station and a destination station. The utility then moves the carrier from the origination station to an intermediate location between the originating station and the destination station. While located proximate to this intermediate location, an identification element associated with the carrier or its payload may be read to identify the destination station for the carrier. At this time, the utility may recalculate possible routes between the current intermediate location and the destination station. If multiple routes are available, the utility may select one of the routes based on one or more criteria including, without limitation, shortest route, quickest delivery, least impact, and/or priority.

According to another aspect, prioritized handling of pneumatic carriers is achieved by identifying a priority of the contents of the carrier. In this aspect, a utility is provided that receives inputs from at least first and second communication devices of a pneumatic carrier system that read identification elements of first and second pneumatic carriers and/or payloads of those carriers that while located within the pneumatic carrier system. This identification information received from the identification elements is utilized to identify first and second travel routes or paths of the first and second pneumatic carriers. Upon identifying an overlap or conflict of these carrier paths, the utility identifies a priority of each of the payloads of the two carriers. Based on the identification of a higher-priority payload, the utility processes the higher-priority carrier and its payload through the conflicting component prior to the lower-priority carrier and payload.

In a further arrangement, the system is operative to divert the lower-priority carrier to a temporary location to allow passage of the higher-priority carrier through the common path segment/conflicted component. In this arrangement, after the higher-priority carrier has passed through the conflicted component, the utility retrieves the lower-priority carrier from temporary storage and proceeds processing of the lower-priority carrier towards its destination.

According to another aspect, a system and method (i.e., utility) is provided for expedited delivery of a pneumatic carrier through a pneumatic carrier system. The utility includes receiving a priority input for a first pneumatic carrier or the payload of the first pneumatic carrier. The utility then identifies a first travel path through the pneumatic carrier system for the first pneumatic carrier. The utility then identifies all pending transactions in the queue of the pneumatic carrier system that utilize one or more of the components and/or pneumatic tubes of this first travel path. In order to provide expedited transport of the first carrier through the first travel path, all pending transactions that are identified as utilizing one of the components along the length of the first travel path are either suspended (e.g., if they are not yet located in the travel path component) or redirected to temporary storage locations in order to allow the high-priority carrier passage through the pneumatic carrier system. Once the travel path is cleared, the first pneumatic carrier may be delivered to its destination free of any intervening transaction. Once delivered, the suspended and/or redirected transactions are reinitiated and/or retrieved to continue their processing.

BRIEF DESCRIPTION OF THE DRAWINGS

For a more complete understanding of the present disclosure and further advantages thereof, reference is now made to the following detailed description taken in conjunction with the drawings in which.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
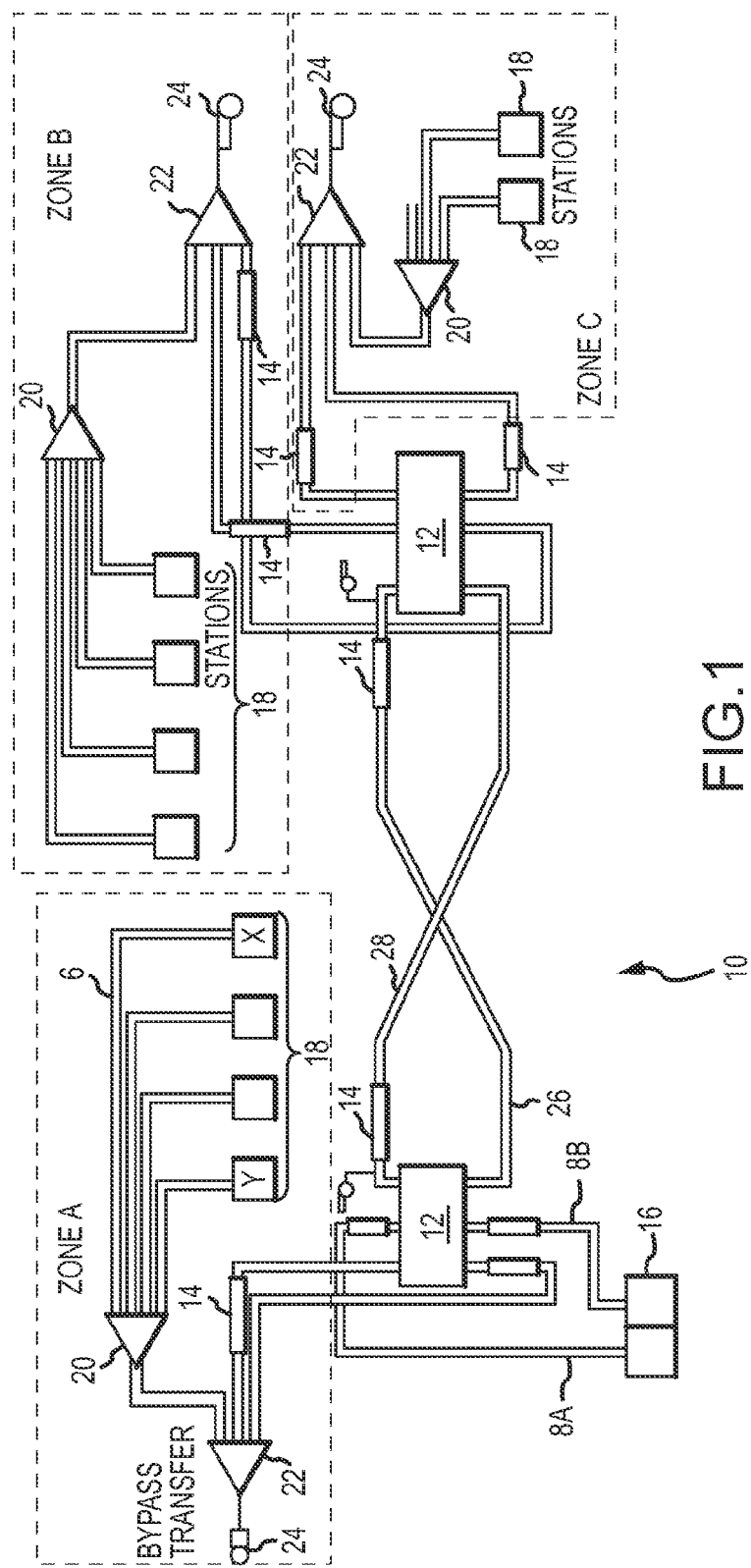
FIG. 1 illustrates one embodiment of a pneumatic carrier system.

Disclosed in FIG. 1 is a simplified system diagram for a pneumatic tube or carrier system 10. In general, the pneumatic carrier system 10 transports pneumatic carriers between various user stations 16, 18, each such transport operation being referred to herein as a "transaction". A transaction is the object used by a control system of the pneumatic carrier system to represent a physical carrier in the system, and it includes transaction information associated with the transaction. The transaction information is used by the control system in controlling the flow of transactions. For each transaction, the transaction information includes an initial source, an ultimate/final destination, a present source, and an immediate destination. Transaction information also includes a unique identifier, such as a number and/or carrier identification, associated with every transaction, and an assigned priority, which is initially derived from the sum of the send priority of the source station and the receive priority of the destination station. The priority of a transaction may be changed in the course of movement of the carrier associated with the transaction through the system. Such transaction information may be stored to transaction records in the system archive.

At each of the user stations 16, 18 a user may insert a carrier, select/enter a destination address/identification and/or a transaction priority, and then send the carrier. The system determines a path to route the carrier and begins directing the carrier through the system. In the illustrated embodiment, each station 18 is interconnected to a transfer unit 20 via single pneumatic tube 6 having an internal bore sized to receive a pneumatic carrier. A high use station 16 (e.g., pharmacy station in a hospital) may be connected via dedicated input and output pneumatic tubes 8A, 8B. In the case of the single tube stations 18, the transfer unit orders carriers arriving through any of the different tubes connecting the different stations 18a-x into a single pneumatic tube or directs a carrier arriving from the single pneumatic tube into any one of the tubes connected to a desired station. The single pneumatic tube exiting the transfer unit 20 is further in connection with a vacuum bypass transfer unit 22 (i.e., turn around transfer unit) and a blower 24 that provides the driving pneumatic force for carrier movement. A set of transfer units 20, 22 a blower 24 and one or more stations 18 typically define a single zone (e.g., zones A, B, and C). The bypass transfer unit 22 is typically the point of connection to each zone. In further embodiments (not illustrated) the bypass transfer unit may also connect directly to one or more user stations free of an intervening transfer unit 20. Typically, each zone (A, B and/or C) will include multiple stations 18 that may service different portions of a section of a facility. For instance, each zone may service a different floor or wing of a hospital and each station may be located in different locations of the floor/wing to service different caregiver stations that may be assigned to different patients/rooms.

Generally, the zones are interconnected to adjacent zones by one or more inter-zone (IZ) transfer tubes 26, 28. In the presented embodiment, the IZ tubes each include a device for temporarily holding carriers passing between zones. One such device is a traffic control unit (TCU) 14 which is employable to receive, temporarily store and controllably release one or more carriers. Such functionality allows, for example, holding a carrier until a path through a subsequent potion of the system becomes available and/or until a source of pressure or vacuum becomes available. In certain configurations, one or more TCUs 14 may be provided to operate as linear storage devices, e.g., on a first in first out (FIFO) basis. Other transfer units include multi-linear transfer units 12 that allow for transferring a carrier from any of a first plurality of pneumatic tubes to any of a second plurality of pneumatic tubes.

Figure 2:
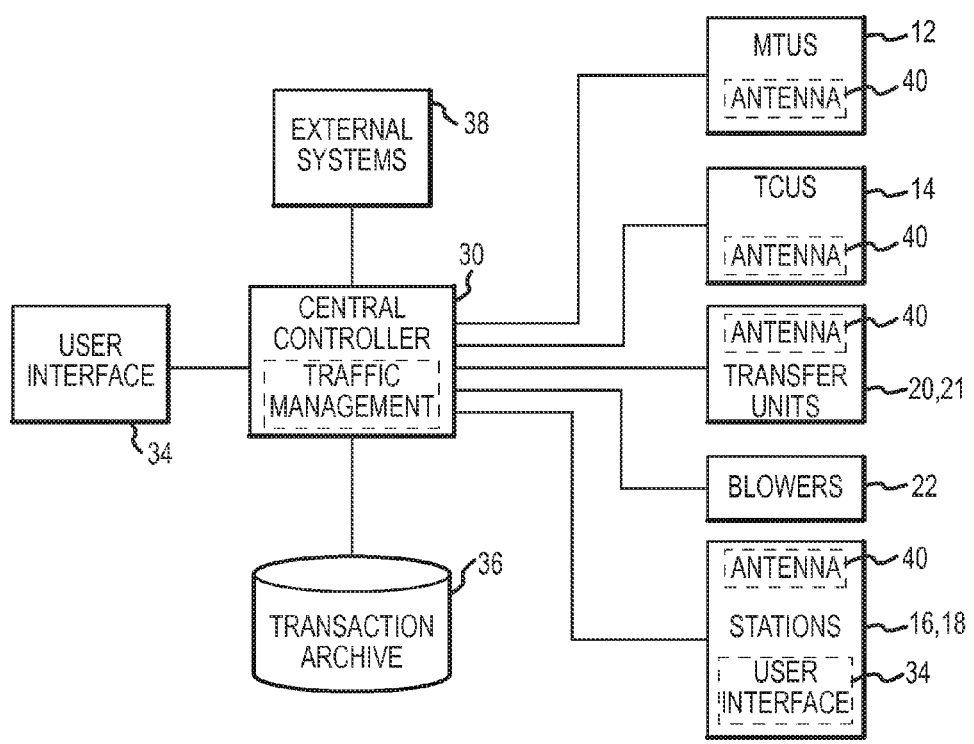
FIG. 2 illustrates a control system for use in controlling a pneumatic carrier system.

All of the components described in FIG. 1 electronically connect to a central controller which controls their operation. Disclosed in FIG. 2 is an electrical system diagram for the pneumatic carrier system 10 described herein. Providing centralized control for the entire pneumatic carrier system 10 is a system central controller (SCC) 30. The SCC 30 may include a digital processor and memory. The SCC 30 may be configured as one or more programmable digital computers. Aspects of the inventive pneumatic carrier system control functions described herein are in the general context of computer-executable instructions of computer programs and software that run on computers (e.g., SCC, personal computers, servers, networked computers etc.), those skilled in the art will recognize that the invention also can be implemented in combination with other program modules, firmware and hardware. Generally, program modules include routines, programs, components, data structures, etc. that perform particular tasks or implement particular abstract data types. Moreover, those skilled in the art will appreciate that the invention can be practiced with other computer configurations.

Connectable to the SCC 30 may be one or more user interfaces 34 through which a system user may monitor the operations of the system and/or manually enter one or more commands to control its operation. Typically, at least one user interface 34 is located at or within an area serviced by stations 16, 18. For example, in a medical facility application, one or more user stations 16, 18 and at least one user interface 34 may be provided within each emergency room, laboratory, nursing station, etc. The user interfaces 34 may be contained in the stations 16, 18 or may be stand-alone units.

Each of the components described above in relation to FIG. 1 may include one or more electrical and/or electro-mechanical components which provide for the physical movement of a carrier within the system 10 and/or the obtainment/provision of information relating to the location of the carriers within the system 10. In this regard, the components shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation. Further, each of the user stations 16, transfer units 20, 22, MTUs 12, tubes 6, 8 and TCUs 14 may incorporate antenna devices/readers 40 configured to energize and retrieve identification information from identification devices such as RFID chips that may be incorporated into each of the carriers. Such a system is set forth in co-assigned U.S. Pat. No. 7,243,002, the contents of which are incorporated herein by reference.

Referring again to the electrical system diagram of FIG. 2, it may be seen that various transfer units 20, 22 and blowers 24 are also electrically connectable to the SCC 30. Through these connections, SCC 30 may send command signals to these devices so that they are actuating and operating at particular times and in particular sequences to affect the completion of the various carrier transactions. Other signals exchanged may include various monitoring signals that indicate the devices are operating as desired.

The SCC 30 is further connectable to a transaction archive 36, or database, which is configured to store transaction information/records for carriers moving within the system 10. The transaction information may include identification information for carriers moving through the system and destination information entered by a system user. Further, the transaction information may include sender identification, recipient identification, security information (e.g., PIN numbers), priority information and/or location information obtained via tracking inputs received from antenna devices/readers 40 located at user stations 16, TCUs 12, or other components along the travel path of a given carrier. External systems 38 may be connected to the pneumatic carrier system depending on the purpose of the pneumatic carrier system 10. For example, the external systems 38 may include a lab information system, a pharmacy information system, a patient information system, a security information system and/or messaging systems (e.g., email, text, paging, or wireless system, etc.).

Figure 3:
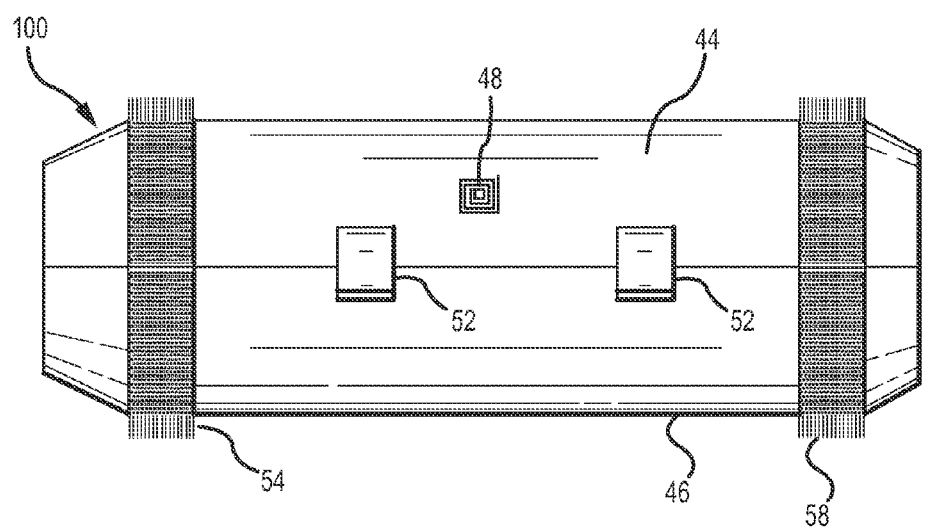
FIG. 3 illustrates an exemplary pneumatic carrier.

Disclosed in the FIG. 3 is a view of a pneumatic system carrier 100 which includes at least one identification device, or, as shown ID chip 48. Though shown as a small, integrated chip, it will be appreciated that other identification devices may be used and that the configuration and location of the identification device may vary. For instance, the identification device may be formed as a band disposed about the circumference of the carrier 100 to allow reading the identification device by an antenna device/reader 40 irrespective of the orientation of the carrier 100. In a typical carrier, the carrier 100 includes first and second shell members 44 and 46 which are adjoinably cylindrical in cross-section for use in correspondingly cylindrical tubes of the system 10. The shell members 44 and 46 may be pivotably interconnected by a hinge member (not shown), and latches 52 may be provided for securing the first shell member to the second shell member in a closed configuration. Also included as part of the carrier 100 are wear bands 54, 58.

Incorporated into one of the shell members 44, 46 and/or wear bands 54, 58 is the ID chip 48. This ID chip 48 is configured to store and provide access to identification information written thereon. In one configuration of the system, the ID chip 48 may be a read-only chip. Alternatively, ID chips 48 may be provided so that an antenna 40 may write information to the ID chips 48 as well as read data there from. When the carrier 100 containing a payload moves from a first station 16, 18 to a second station 16, 18, information can be read off the ID chip 48 and sent to the SCC 30 (e.g., for storage). In some instances, the ID chips 48 may be read while the carrier 100 is in motion (i.e., on the fly). In this regard, antenna device/readers may be incorporated into pneumatic tubes within the system 10 as well as the system components such as 6, 8, 12, 14, 16, 18, 20 and 22.

Figure 4:
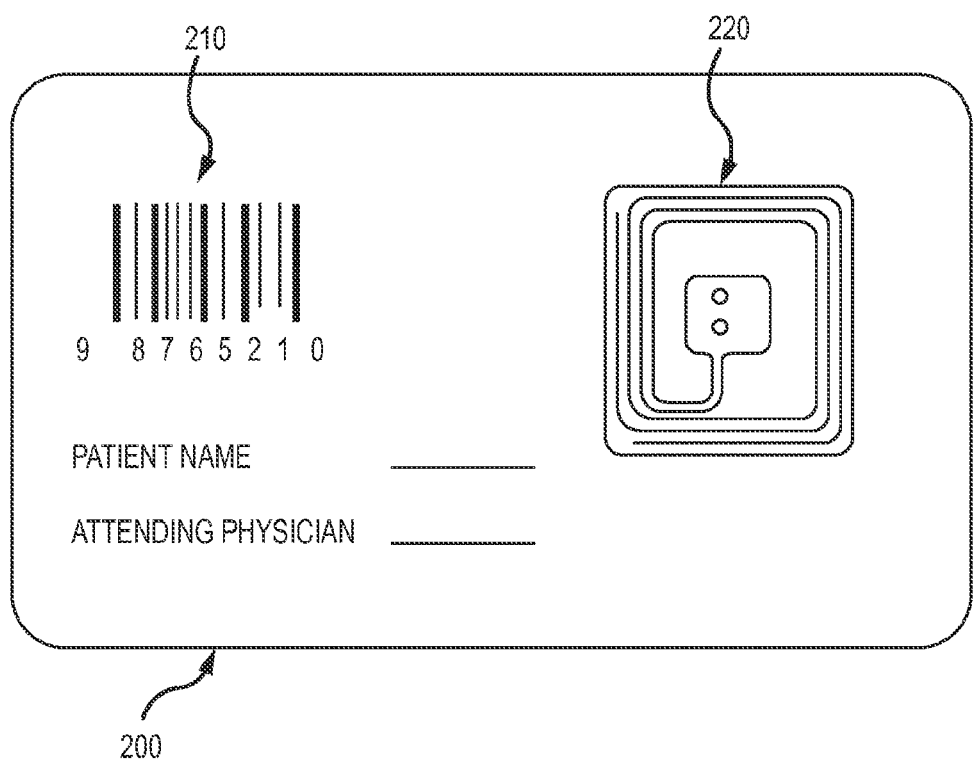
FIG. 4 illustrates an identification tag adapted for attachment to a carrier payload.

In addition or alternatively, a payload carried by the carrier 100 may include a ID chip such that the payload may be interrogated by the system as a carrier 100 including the payload passes though the system. FIG. 4 illustrates a tracking tag 200 that may be attached to an item that is to be transported by the pneumatic carrier system (i.e. a payload). As shown, the tag utilizes a dual identification element. Specifically, the tag 200 includes a bar code 210 and an RFID tag 220. This tag 200 allows an item, to which the tag 200 is attached, to be tracked utilizing either a bar code scanning system or an RFID system. If such a tag is attached to a payload of a pneumatic carrier, the RFID tag may be interrogated as the carrier passes through the system.

Figure 5:
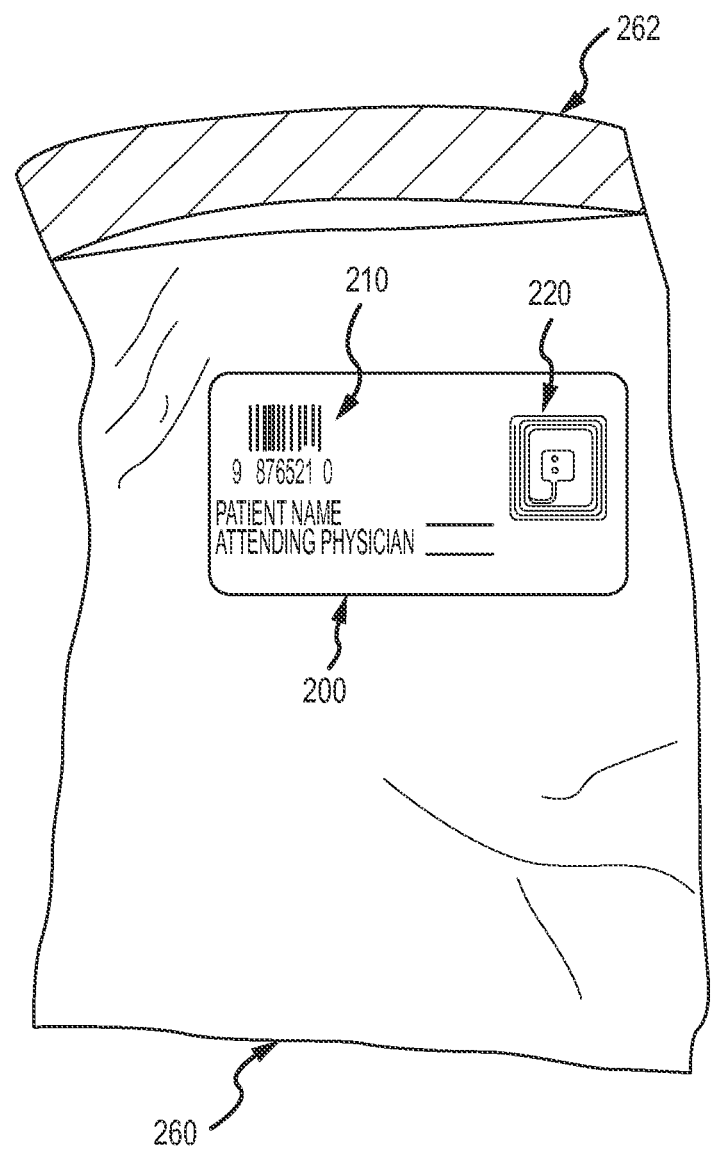
FIG. 5 illustrates an identification container for disposition within a carrier.

The ability to interrogate an identification tag of a payload while the payload is disposed within a carrier provides a number of benefits for the present system, as is more fully discussed below. However, the ability to attach such an identification tag to items is somewhat limited. Specifically, it has been recognized that items transported and tracked in many settings come in multiple different form factors. For instance, such items may be as varied as syringes, pill bottles, loose pills, etc. Accordingly, not all of these items provide a ready means for attaching an identification tag 200. Accordingly, the item may be disposed within an identification container as illustrated in FIG. 5.

The identification container 260 is represented in the current embodiment as a flexible bag (e.g., plastic bag) having three closed ends and one open end that collectively define an interior area. In this arrangement, the tag 200 may be attached to an outside surface of the container 260, and an item for which interrogation functionality is desired may be placed within the container 260. In this arrangement, items having multiple different form factors may be conveniently transported through the system while having payload interrogation capabilities. Further, to ensure that the items remain within the container 260, the present container includes a sealable flap 262 that has a peel and release liner that may be removed from the flap 262 to expose an adhesive surface which may then be adhered to the front surface of the bag thereby sealing an item within the interior of the container 260. Though discussed primarily in relation to a flexible container, it will be appreciated that other containers may be utilized. For instance, rigid containers such as boxes or capsules may be utilized as well. Further, each of these containers may be sealed such that opening of the container breaks a seal or otherwise shows evidence of tampering.

Enhanced Functionality

Figure 6:
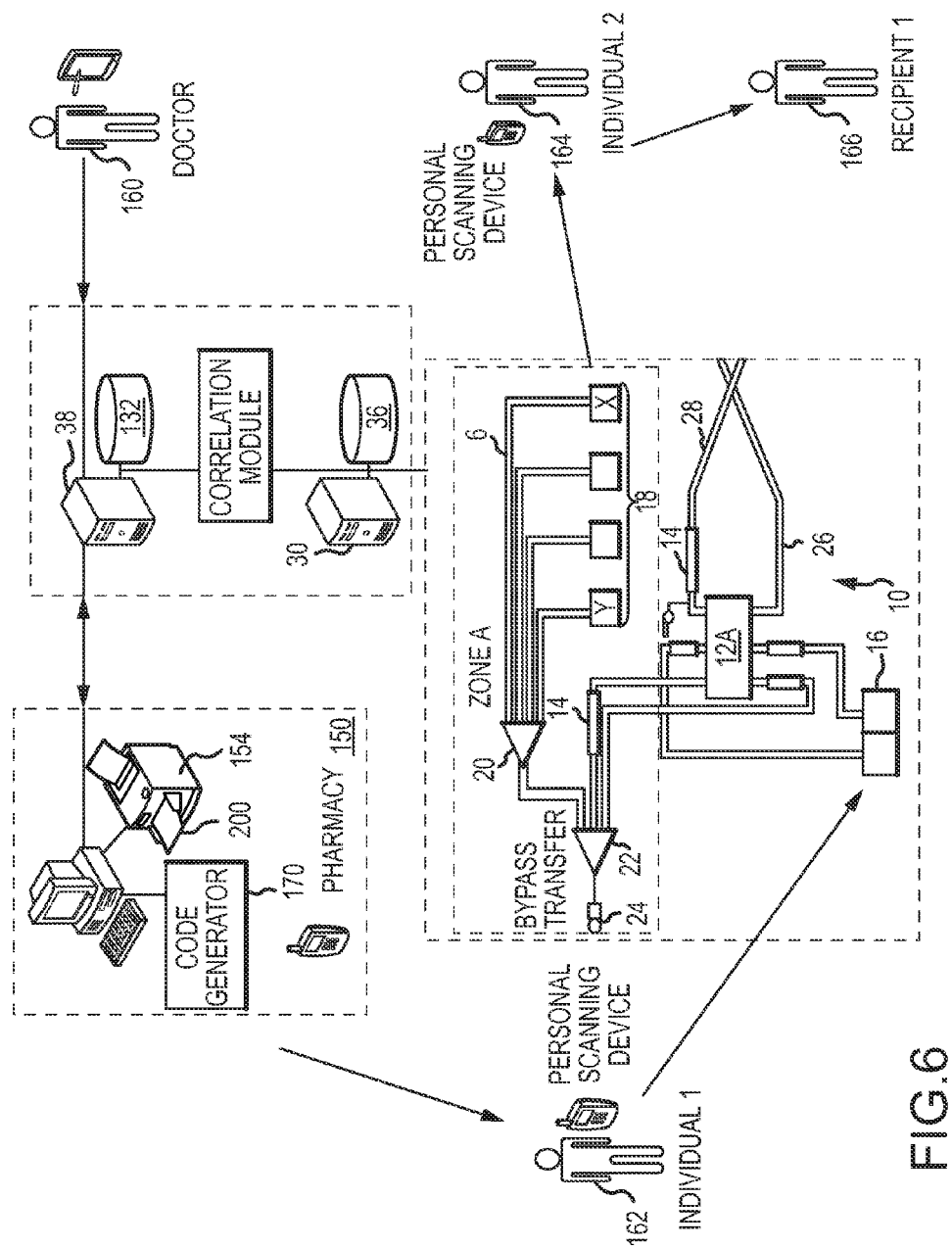
FIG. 6 illustrates an automated delivery process.

The ability to interrogate the contents of a pneumatic carrier provides various enhanced functionalities in relation to existing pneumatic carrier systems. In one embodiment, the ability to interrogate a payload of a pneumatic carrier allows for automated delivery of the payload to a desired recipient free of a sending user specifying the location of the recipient. FIG. 6 illustrates an automated recipient delivery system for use in a hospital setting. As illustrated, the pneumatic carrier system 10 utilizes a proximity sensing system (RFID system) attached to a payload to effect delivery of an item from a first location (e.g., pharmacy) to a desired recipient (e.g., patient). In this exemplary embodiment, a health care professional 140 requests a drug or other item from a pharmacy 150. Initially, the health care professional generates a request which is received by a network server 38, which records the request in a record in a database 132. This record may be appended to, for example, a patient record that may include, among other things, the name or identification of the patient, the current location of the patient and/or caregivers currently assigned to the patient (e.g., attending nurse). This order is then forwarded to the pharmacy 150, where pharmacists or other technicians 162 fill the order. In conjunction with filling the order, the pharmacy technicians may enter information into a user workstation 152. In the present embodiment, the workstation 152 is interconnected to a printer 154 which is adapted to generate the tag 200 discussed in relation to FIGS. 4 and 5.

Incorporated within the user workstation or the network server 38 is a code generator 170. The code generator 170 is adapted to generate a code for an RFID element. This RFID code may be identical to an identification code for the patient (e.g., a bar code), or may be a separate code. The code generator may provide the RFID code to a correlation module 170 associated with the SCC 30 and network server 38. A record is generated that identifies the relationship between RFID code and the patient record (e.g., patient identification code). In this regard, patient records in the hospital database 38 may be indexed to the RFID code of the tag and thereby accessed upon identification of the RFID code.

The pharmacy may generate the tag 200 for attachment to the requested item. In one arrangement, a printer 154 may be adapted to print RFID tags. In another arrangement, codes of pre-generated RFID tags may be correlated to a patient identification code. In any arrangement, once the tag 200 is generated and attached to an item, a pharmacy technician may make any appropriate entries into the system utilizing, for instance a personal scanning device, computer terminal etc.

In the illustrated embodiment, the technician 162 or other individual delivers the tagged item to a first user station 16 of the pneumatic carrier system.

In the present embodiment, delivery of the item to the pneumatic carrier system may 20 include disposition of the item within a carrier that is adapted for use within the pneumatic carrier system 10. In this embodiment, once the item is disposed within the carrier, the carrier may be delivered to a first user station 16. The system 10 may then interrogate the carrier and/or the tag attached to the item. Based on information from the tag 200, the SCC of the pneumatic carrier system 10 may access the hospital record stored in the database 132 to identify a current location of the recipient 166.

In the current exemplary embodiment, the desired recipient 166 is identified as being in an area of the facility serviced by zone A. Further, the record may identify a caregiver 164 who is assigned to the patient as using station 18x. This station 18x may represent the station that is in closest proximity to the recipient 166 or the station to which the responsible caregiver 164 is assigned. In any arrangement, the SCC may automatically select the appropriate delivery station (e.g., 18x) and generate control signals to route the carrier including the payload to the automatically identified station. The system 10 may then launch 10 the carrier into the pneumatic carrier system. Accordingly, once the carrier and included payload are received by the user station 18x the system may generate a message for the caregiver 164. Such a message may be generated on an output at the station 18x or on a personal communications device (e.g., smart phone, PDA, pager etc.) of the caregiver 164. Accordingly, the receiving caregiver 164 may enter appropriate information into a user interface (e.g., located at the second user station 18, PDA etc.) to confirm delivery and/or take appropriate actions to deliver the payload to the recipient 166.

The ability to query the database record 132 of the patient allows for delivering an item to a patient even if the patient moves between a first time when an item is requested and a second time when the item is delivered. For instance, if a patient moves from recovery (e.g., after surgery) to an in-patient room, the patient records will be updated to reflect this move. Accordingly, the delivery of the item may be routed to the patient's current location. Further, the delivery location for the pneumatic carrier may be dynamically adjusted. That is, if the patient location changes during the delivery process, the SCC may identify this change and redirect the carrier. Likewise, if the carrier is delivered to a previous location of the patient (e.g., shortly after a move) a caregiver may simply return the carrier to the system 10, which will then redirect the carrier to the new patient location without the caregiver providing the new location.

Figure 7:
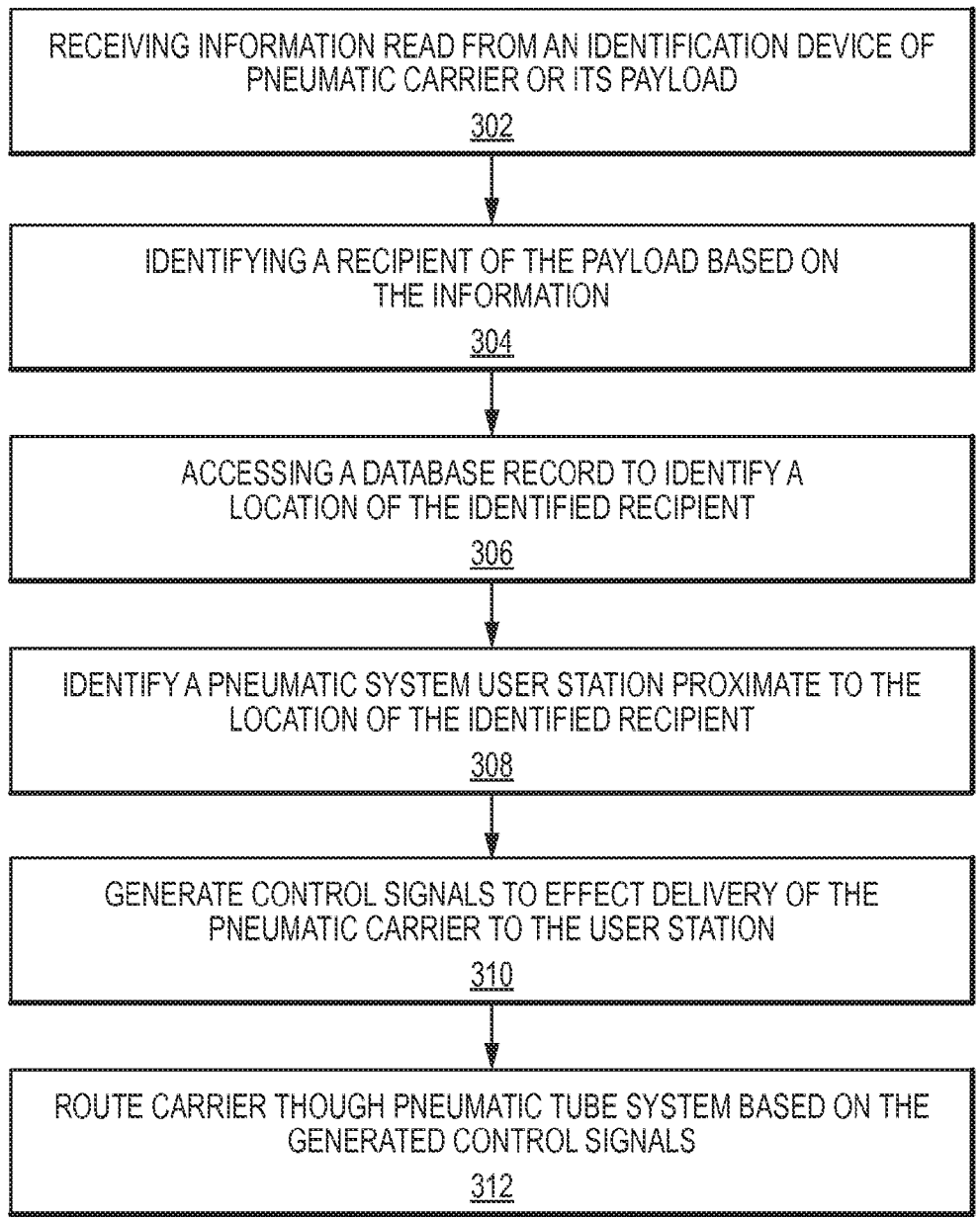
FIG. 7 illustrates a process flow sheet of an automated delivery process.

FIG. 7 illustrates the automated delivery process 300. Initially, the process 300 includes receiving information read 300 from an identification device of a pneumatic carrier or its payload. In various different arrangements, this information may be read from a proximity sensor or an optical identification element, such as a barcode. Based on the information read from the identification device, a recipient of a payload included within the pneumatic carrier is identified 304. This recipient may be identified by information read directly from the identification device or from a computerized record (e.g., from a computer readable storage medium) that is accessed based on the information (e.g., identification device code etc.). Once the identity of the recipient is known, the process 300 includes accessing a database record to identify a current location 306 of the identified recipient. The process then identifies a pneumatic system user station 308 that is proximate to the location of the identified recipient. The process then includes generating control signal 310 to effect delivery of the pneumatic carrier to the identified user station. At this time, the carrier is routed 312 through pneumatic carrier system based on the control signals.

Another enhanced function that is made available via payload interrogation is specialized handling based on the needs of a particular payload. Within the healthcare industry, pneumatic carrier systems are often used to move patient samples and drugs from a centralized dispensing or collection point to the point of analysis or use. For example, a blood sample may be drawn at a patient's bed side or at a central collection point (such as a satellite phlebotomy lab) and sent to a central lab for analysis and reporting. Similarly, a central pharmacy may receive a doctor's orders and dispense medications for distribution to a plurality of stations via pneumatic tube and then to the patients themselves via nurses positioned near the stations.

During transport, the samples and drugs are subjected to a number of physical forces. These physical forces may be systematic or random and are inherent in any transport process involving translocation from one position to the next. Examples include acceleration from a resting state at the dispatching station to a nominal average speed within the tube system followed by a deceleration at a receiving station from the average speed to a resting state and/or impact. These physical forces transfer energy to the payload (e.g., samples drugs, etc) of the pneumatic carrier. This energy can alter the integrity, properties, and characteristics of samples and drugs during the translocation process. For example, a separated drug comprised of immiscible fluids can be mixed by agitation from the physical forces of translocation. Another common example is the separation of blood components by centrifuging, a common process of imparting an invariant force by subjecting a blood sample to centripetal acceleration and/ or shaking caused by the carrier passing over the joints of the tubes of a pneumatic carrier system. In this latter regard, it is recognized that some path segments of a pneumatic carrier system are smoother (e.g., have smoother pipe joints) than other segments. Accordingly, for certain sensitive payloads, it may be desirable to alter how the pneumatic carrier system handles the carrier holding such a sensitive payload to reduce the forces imparted on the carrier and its payload. In contrast, numerous other items transported by a pneumatic carrier system such as documents, syringes etc., are substantially immune to the forces applied and may be handled in a manner expediting their transfer through the system.

In general, translocation processes that take the shortest paths will impart less energy to the carrier and payload. For any translocation process that moves a carrier or payload at a particular velocity along paths of comparable smoothness, the shortest and most direct path will both require the least amount of energy to move the carrier or payload, and will also impart the least amount of energy to the carrier because (a) the path has fewer total stochastic perturbations, (b) the carrier is transported in less time preventing absorption of more mechanical energy, and (c) the path is more linear with fewer systematic perturbations. Likewise, a longer but smoother path may impart fewer forces on a carrier and its payload than a shorter but rougher path.

Further, the curvature and elevation changes in the pneumatic transport system that are typically necessary to incorporate such a system into a facility may also change the interaction between the carrier and the pneumatic carrier system. Carriers accelerate and decelerate frequently as they travel in a pneumatic carrier system. For example, carriers 100 that transition from a first plane to a second plane (e.g., around a curve of a tube) decelerate and are subjected to centripetal accelerations necessary to affect the direction change.

In summary, during passage through the pneumatic system, the carrier is subjected to a number of physical forces. For instance, when the carrier is launched into the system (e.g., from a dispatch station), the carrier is accelerated from a resting position to a travel velocity. Likewise, the carrier is decelerated from a travel velocity to a resting position upon arrival at a destination station. In between, the carrier may experience numerous acceleration/decelerations as the movement of the carrier is stopped and restarted as it is transferred between zones, etc. Further, due to the smoothness and curvature of the transport tubes as they are routed throughout a facility, the carrier will typically experience jarring and centripetal forces, respectively, as it travels through the system. Stated otherwise, the carrier is subjected to physical forces inherent to its translocation process. In addition to being applied to the carrier, these forces are also applied to the payload/contents of the carrier.

In all cases, the transport cycle introduces mechanical energy into the carrier and its contents. Minimizing the mechanical energy sources and their transfer to sensitive carrier payloads is one goal of the presented inventions. Specifically, by interrogating a payload and accessing a record associated with that payload, a sensitivity indicator may be identified by the SCC such that, if desired, the handling characteristics of the pneumatic carrier system may be altered based on the velocity and/or path selected to transport a carrier.

Reducing the carrier's speed through the system is one method for reducing the energy transfer to a carrier, particularly for sensitive payloads. Under basic conditions, the blower can be controlled via the SCC to have discrete responses to various types of transactions. For example, an empty carrier or a carrier with an insensitive payload may have a standard handling profile with a constant acceleration and deceleration as well as a high average speed, while a sensitive payload could have a variable handling profile, which allows for establishing a slower acceleration, a slower average speed, varied speed though path segments (e.g., slower around bends, faster on straight paths) and/or a slower deceleration. In this latter regard, the blower may ramp up and ramp down to reduce acceleration forces on the carrier. Likewise, the ability to identify the location of the carrier as it passes though the system (e.g., read the RFID tag of the payload and/or carrier) allows for reducing the velocity of a carrier as it passes through rougher or curved sections of the pneumatic carrier system. Such a system for altering the handing characteristics of a pneumatic carrier system are set forth in co-owned U.S. Patent Publication No. 2011/0270440 entitled "Variable Speed Drive for Pneumatic transport System", the entire contents of which are incorporated herein by reference.

Different types of payloads, as well as the appropriate handling profile, may be determined either discretely by the user, by interrogation of the carrier itself, for example through radio, optical, magnetic or other coupling means designed to transfer information about the carrier contents to the control system or by interrogation of a payload which may identify the contents of the payload. In this latter regard, if a payload is identified as a type of payload requiring special handling (drugs, blood samples, IV bags etc.) special handling profiles may be implemented. Where the payload itself is interrogated, the user who places the carrier including that payload into the system is not required to provide any sensitivity input. In such an embodiment, the system may interrogate the payload, and access a corresponding database record to determine information about the payload and appropriately adjust the carrier handling properties of the system automatically based on stored information (e.g., path information) for the pneumatic carrier system.

Figure 8A:
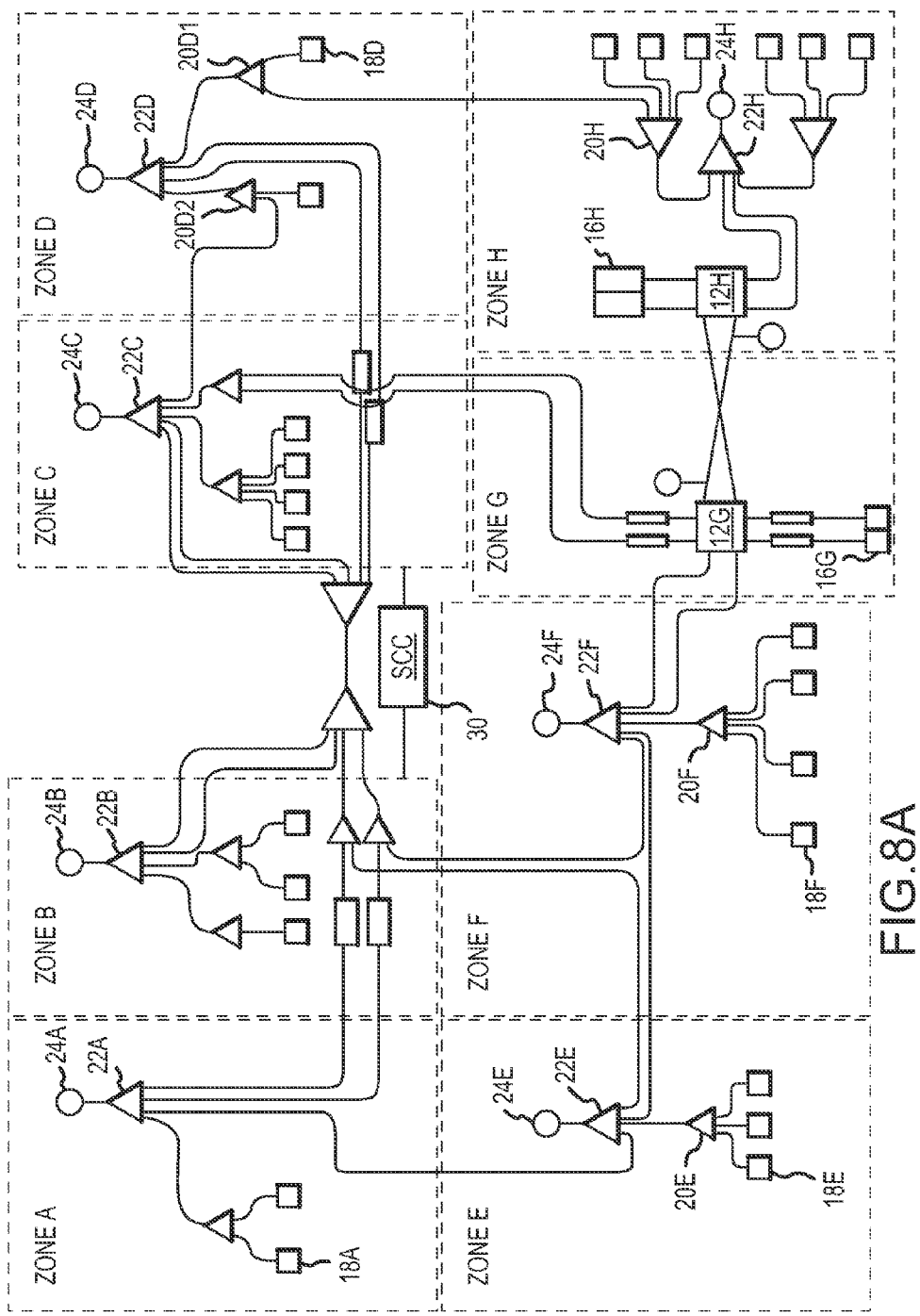
FIG. 8A illustrates another embodiment of a pneumatic carrier system.

FIG. 8A illustrates another embodiment of a pneumatic carrier system where different carrier handling profiles may be utilized to transfer a carrier and payload between user stations. In this embodiment, multiple paths exist between different zones A-H of the system. As shown, the pneumatic carrier system 10 illustrated in FIG. 8A is more complex than the system illustrated in FIG. 1 though utilizing many of the same components utilized in FIG. 1. As is common with larger more complex systems, there often exist multiple pathways between two locations within the system. In the present embodiment, zone G includes a pharmacy or lab station 16G, which commonly experiences high network traffic. A delivery from zone D station 18D to the lab station 16G may be accomplished utilizing various different paths. For instance, a first path may pass from zone D through zone H and then to zone G. Alternatively, such transaction may pass from zone D to zone C and then to zone G. Additional paths are possible. For instance, the transaction may move from zone D to zone C to zone B through zone F and finally to zone G. In such an arrangement, the traffic control systems of the SCC 30 may select a path based on one or more criteria. For instance, the SCC 30 may select the shortest route between the station 18 D and the lab station 16 using the first path through zone H to minimize the forces applied to the carrier during transit. However, the system may include path segment information for the segments linking the various different zones. In this regard, the SCC may determine that the second path through zone C to zone G is a smoother path and therefore is more likely to impart fewer forces to the carrier. Accordingly, this smoother path may be utilized.

Figure 8B:
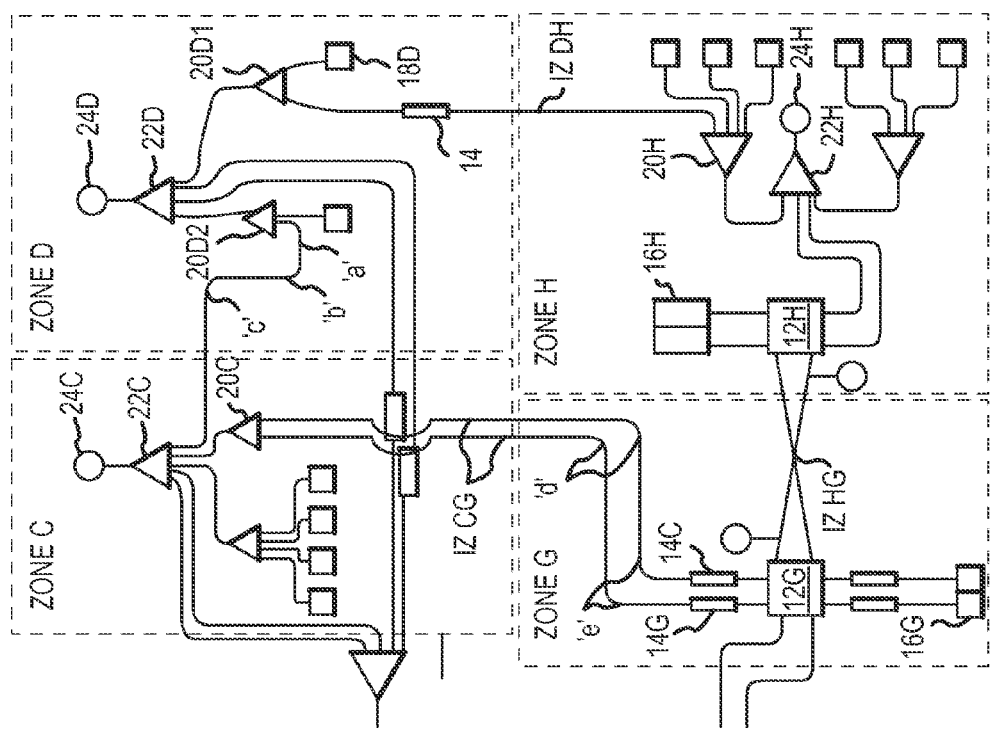
FIG. 8B illustrates a portion of the pneumatic carrier system of FIG. 8A.

In the instance where the second path through zone C is selected, the carrier may be drawn from the origination station 18 D through the transfer unit 20 D1 into the bypass transfer unit 24 D under vacuum from the blower 22 D. See FIG. 8B. Once the bypass transfer unit 24 D is redirected, the blower 22 D may apply pressure to the carrier to move the carrier through transfer unit 20 D2 which is aligned with the inner zone transfer tube IZ CD. This transfer tube IZ CD may comprise a long tube having various curves 'a', 'b' and 'c'. If a sensitive contents handling profile is selected, the blower 22 D may be operated to reduce its air flow rate and, hence, the speed of the carrier as the carrier passes around curves 'a', 'b' and 'c'. Transfer controls may align system components though IZ CG and the carrier may be moved through the zones until the carrier arrives at lab station 16G. As may be appreciated, the carrier handling profile may again be variably adjusted as the carrier passes through bends 'd' and 'e' in zone G.

Alternatively, the SCC may select a handling profile that reduces the transfer time of the carrier between its origination location (e.g., user station 18D) and its destination location (e.g., lab/pharmacy station 16G). In this embodiment, the system may access the pending transactions of the zones of the potential paths between the origination location and destination location. In most pneumatic carrier systems, transaction requests are placed in a queue and are handled in a first-in first-out (FIFO) basis. That is, carriers are handled in the order in which they are received. Accordingly, in the present embodiment where the SCC determines two or more paths (e.g., first path Zone D-H-G or second path Zone D-C-G) exist for a transaction, the SCC will determine which path will result in the shortest delivery time. That is, the SCC may determine how many transactions are pending in each of the zones and thereby determine which path will result in, for example, the fewest transactions being handled before the present transaction. Accordingly the SCC may select the path having the fewest prior pending transactions. Further, the SCC may estimate a time required to complete the prior pending transactions in each queue. That is, while one zone (e.g., zone C) may have more transactions pending than another zone (e.g., zone H), the total time required to handle these transactions may be lower due to shorter expected transit times for each transaction. For instance, for a carrier transaction between user station 18D of zone D and lab station 16G of zone G, the transaction for each path (e.g., first path Zone D-H-G or second path Zone D-C-G) will require transit in common zones D and G. Therefore, the pending transaction of Zones C and H will generally be determinative of the shortest delivery time. For instance, the queue records may be embodied, in a simplified version, as:

|        | Transaction | Transaction time | Priority |
|--------|-------------|------------------|----------|
| ZONE C | 12345       | 1 Minute         | 3        |
|        | 12349       | 2.5 Minutes      | 3        |
|        | 12350       | 2.0 Minutes      | 4        |
|        | 12352       | 1.5 Minutes      | 5        |

|        | Transaction | Transaction time | Priority |
|--------|-------------|------------------|----------|
| ZONE H | 12346       | 3.0 Minutes      | 3        |
|        | 12347       | 2.5 Minutes      | 3        |
|        | 12348       | 2.5 Minutes      | 5        |

In such an exemplary arrangement, the first path though Zone H may have fewer prior pending transactions (e.g., 3 rather than 4) but may entail a longer delivery time (e.g., 8 minutes to 7 minutes). Accordingly, the SCC may utilize such information to select which travel path to utilize.

Another benefit of the ability to interrogate payloads and/or a carrier is the ability to prioritize the carriers in a queue. Currently, with the typical FIFO processing there is limited if any ability to reposition carriers in a queue to allow processing of higher priority carriers. Some hospitals are currently uneasy with the use of a pneumatic carrier system for surgical applications due to the uncertainty of when an item may arrive. Identification (e.g., RFID) coupled with prioritization may alleviate such concerns. That is, payloads may be pre-categorized based on the identity of their contents. For instance, if a caregiver orders a drug for administration to a patient during a specified nurse shift, the priority of such a payload may be standard priority (e.g., priority 3). Likewise, other payloads may be categorized as lower priority (e.g. paperwork). Finally, higher priority items that are time critical may have an elevated priority (e.g., priority 1 or 2). In this embodiment, a higher priority transaction may be moved in front of lower priority transactions in a queue. Further, it may be desirable to write the priority of a payload to the RFID tag attached to the payload or attached to a carrier such that as it passes between zones, the transaction may be appropriately prioritized.

The following table illustrates the queue of zone C of carrier transaction '12358' that is scheduled to pass through the zone:

|        | Transaction | Transaction time | Priority |
|--------|-------------|------------------|----------|
| ZONE C | 12345       | 1 Minute         | 3        |
|        | 12349       | 2.5 Minutes      | 3        |
|        | 12350       | 2.0 Minutes      | 4        |
|        | 12352       | 1.5 Minutes      | 5        |
|        | 12358       | 1.4 Minutes      | 2        |

As shown, if the system uses FIFO processing, the subject transaction 12358 would be handled after four other transactions. However, due to its priority, the queue is rearranged to handle this higher priority transaction ahead of the lower priority transactions:

|        | Transaction | Transaction time | Priority |
|--------|-------------|------------------|----------|
| ZONE C | 12358       | 1.4 Minutes      | 2        |
|        | 12345       | 1 Minute         | 3        |
|        | 12349       | 2.5 Minutes      | 3        |
|        | 12350       | 2.0 Minutes      | 4        |
|        | 12352       | 1.5 Minutes      | 5        |

That is, in the present embodiment the ability to associated a priority with the payload or carrier of a transactions allows for re-calculating the queue. In this regard, if the transaction originating in station 18 D has a highest priority rating, it may be moved up the queue above lower priority transactions. In this regard, the system may be utilized to deliver time critical transactions.

Another enhanced function made possible by the ability to ability to interrogate the contents of a pneumatic carrier and/or the pneumatic carrier itself is the dynamic rerouting of the carrier based on current system conditions. During a standard transaction, once a carrier is placed within a station, for instance, station 18 D of zone D, for delivery to a destination location, for instance lab station 16 G of zone G, an initial path may be calculated through the pneumatic carrier system 10. This is illustrated below:

ST 18D→TU 20D1→BPT 24D
BPT 24D→TU 20D1→IZ DH→TU 20 H1→BPT 24 H
BPT 20H→MTU 12H
MTU 12H→IZ HG→MTU 12G
MTU 12G→ST 16G

As shown, in the initial calculated path or route through the pneumatic carrier system 10, the carrier moves from the origination station 18 D through the transfer unit 20 D to the bypass transfer unit 20 D where the blower 24 D is applying vacuum to the carrier. At this time, the bypass transfer unit 22 D would be redirected to direct the carrier back through transfer unit 20 D1 which is redirected to inner zone tube IZ DH into transfer unit 20H and into bypass transfer unit 22 H. At this time, bypass transfer unit 22 H is redirected to output the carrier under positive pressure into MTU 12H for delivery to MTU 12 G via inter zone transfer tube IZ HG and subsequent delivery to lab station 16G. However, the ability to dynamically reroute the carrier allows for recalculating a path through the pneumatic carrier system 10 based on current system conditions. For instance, once the carrier is moved from station 18 D to the bypass transfer unit 22 D, the SCC may recalculate the path of the carrier to account for other carriers within the system. In this regard, if the transaction queue of zone H has more pending transactions (e.g., or pending transactions of higher priority) than zone C, the SCC 30 may recalculate the path through zone C. Such a recalculated path is illustrated below:

ST 18D→TU 20D1→BPT 24D
BPT 24D→TU 20D2→IZ DC→BPT 24C
BPT 24C→TU20C→IZ CG→MTU 12G
MTU 12G→ST 16G

As shown, upon determining the route though zone H is congested, the system may dynamically reroute the carrier through zone C. In this regard, the ability to positively identify the carrier or its payload as the carrier passes through the system allows identifying its destination and calculating alternate routes for the carrier from its present location. Accordingly, if a more favorable travel path is identified, the carrier may be dynamically rerouted to this path. Generally, recalculation may be performed at any location where the carrier or its payload is identified including components (e.g., transfer units, pneumatic tubes) through which the carrier passes. In one arrangement, recalculation is performed each time the carrier is stopped in a system component.

Figure 9:
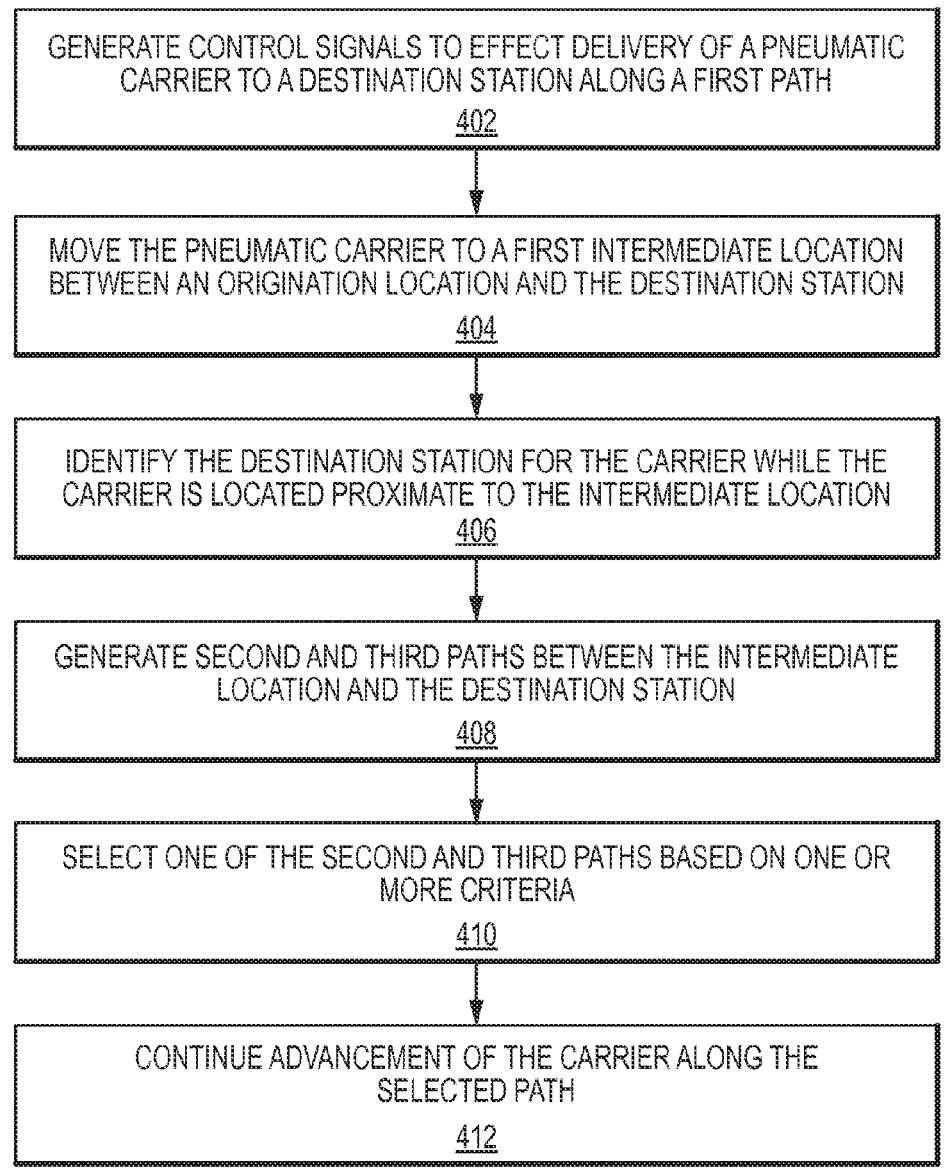
FIG. 9 illustrates a process flow sheet for a dynamic re-routing process.

FIG. 9 illustrates a process 400 for implementing a dynamic rerouting functionality. Process 400 includes generating control signals to affect delivery of a pneumatic carrier along a first path or route 402 between an origination station/location and a destination station/location. In this regard, an initial path between the origination station and the destination station may be generated. Once the initial path is generated, the pneumatic carrier is moved along the first path to an intermediate location between origination station and the destination station 404. While the pneumatic carrier is located proximate to the intermediate location, an identification device associated with the carrier or its payload may be read to identify the destination station for the carrier 406. This may entail accessing a transaction record to identify the destination station or reading the destination station from the identification device. At this time, the process 400 may identify second and third paths between the intermediate location and the destination station 408. As will be appreciated, one of these paths may include the remainder of the first path. Once multiple paths are identified between the current intermediate location of the pneumatic carrier and the destination station, the process 400 selects 410 one of the second and third paths based on one or more criteria. Such criteria may include, without limitation, the shortest path, the path that provides the shortest delivery time, the path that imparts the least forces on the carrier and its payload and/or the path that is soonest available. At this time, the process continues advancement of the carrier along selected path 412. The process may iteratively repeat at multiple intermediate locations between the origination station and destination station. In this regard, the process 400 is able to dynamically adjust the routing of the carrier based on current system conditions.

Another enhanced function enabled by the ability to interrogate a payload or carrier is prioritized component use. As will be appreciated, in many instances a pneumatic carrier system is simultaneously handling multiple transactions. For instance, two transactions may be handled in adjacent zones simultaneously. In such a situation, it is common for each zone to handle transactions individually. Specifically, each zone handles the transactions in their queue based on an initial source, an ultimate/final destination, a present source, and an immediate destination for the present transaction. When transactions between two adjacent zones are slated to delivery to the other of the adjacent zones, the transactions can conflict and the possibility of gridlock arises. Generally, gridlock occurs when two or more carriers are unable to continue moving in the system because of a conflict in the intended paths of each carrier. Typically pneumatic carrier systems can have a maximum number of carriers in transit of approximately one carrier per zone plus the number of inter-zone storage lines. The system 10 described in FIG. 1 or 8A may have a maximum number of carriers in transit approximately equal to the number of parking spaces (TCU slots) in addition to the pressure/vacuum transactions.

To attempt to resolve gridlock situations some previous systems have included a bypass pipes connected to some or all of the by-pass transfer units in the system. Such by-pass pipes are used as temporary destinations for a transactions that are involved in a gridlock condition. Placing one transaction in a by-pass pipe permits another transaction to move through a zone previously occupied or reserved by the transaction that was placed in the bypass pipe. The determination of which transaction to park has previously been a random determination (e.g., zone A has priority over zone B, etc.). The present system allows for resolving priority between conflicting transactions based on the priority assigned to the contents of the carriers. That is, the SCC may interrogate the contents of each carrier and determine which payload has a higher priority. Based on the priorities of the payloads, the carrier having the lower priority payload may be diverted to allow the higher priority payload to pass though the conflicting system component.

FIGS. 10A-D illustrate a simplified case of system conflict where the next immediate destination of two transactions is a common by-pass transfer unit of a common zone. As shown, the present source of a first transaction T1 is a first inter zone inter-zone IZ1 leading into a by-pass transfer unit 22 of a zone. See FIG. 10A. The immediate destination of transaction T1 is inter-zone IZ2 exiting the by-pass transfer unit 22 of the zone. As shown IZ2 is occupied by transaction T2. Likewise, the immediate destination of T2 is inter-zone IZ1, which is occupied by transaction T1. Since the two carriers T1 and T2 cannot physically pass each other going in opposite directions, a conflict or gridlock condition exists at the by-pass transfer unit 22.

In order to alleviate this gridlock, the SCC identifies the priorities of the two transaction T1 and T2. The SCC then generates control signals to temporarily park transaction having a payload with a lower priority in a by-pass pipe or above a user station 18 in the zone. That is, when a gridlock condition is occurs between two opposing inter-zone transactions one of the transactions may be parked in a by-pass tube or partially delivered into the intervening zone. For instance, the lower priority transaction T1 may be received into the by-pass transfer 22 of the PV zone and parked at a location above one of the user stations 18a-18n in the PV zone. See FIG. 10B. This temporarily moves the transaction out of the way of the opposing transaction T2.

Figure 10:
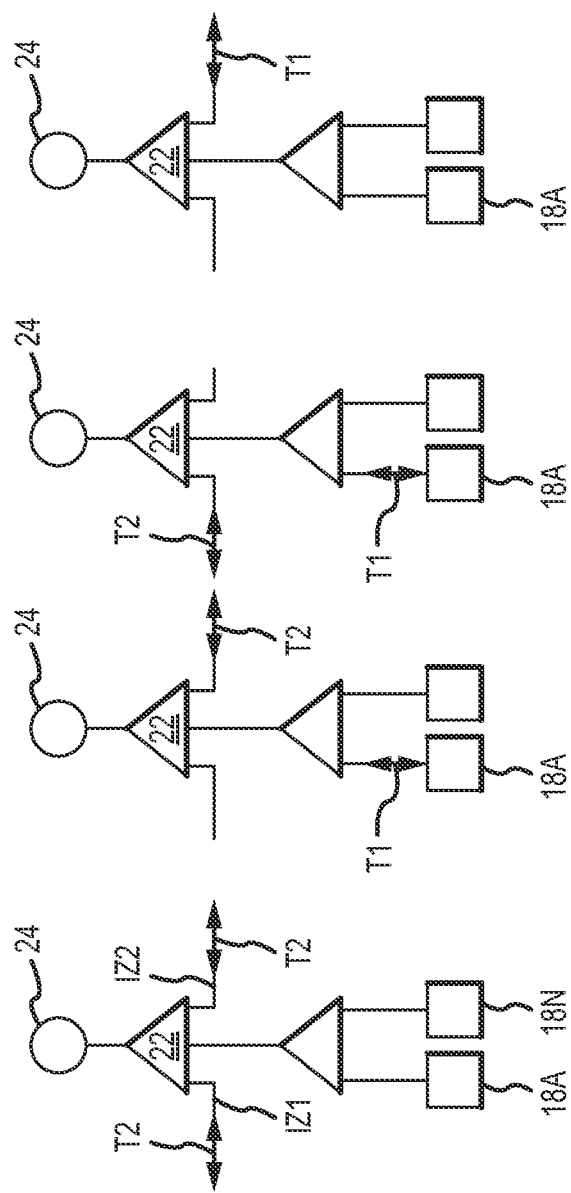
FIGS. 10A-D illustrate alleviation of a conflict condition based on carrier priority.

Such temporary delivery to a location above one of the user stations 18a-n may include at least partially closing a slide plate above the carrier station (e.g., 18a). In this regard, the carrier may be moved to a position above the carrier station but not actually delivered into the carrier station. In this arrangement, the carrier is available for automated retrieval from the user station 18a. That is, no system user is required to re-load the carrier into the user station as would be the case if the carrier dropped into a receiving bin of the user station. In addition, it may be desirable to temporarily disable the user station to prevent interruption of this 'station by-pass' procedure. It will be appreciated that the different user stations of a given PV zone may be located at different distances from the bypass transfer unit. Accordingly, it may also be desirable to select a station for use as a by-pass location (e.g., resolver) that is located nearest to the bypass transfer unit in order to reduce transfer times. However, this is not a requirement. Once the carrier is parked above the user station, the other transaction T2 may be received by the bypass transfer unit and transferred to IZ1. See FIG. 10C. Accordingly, after the second transaction T2 has moved through the PV zone, the system may retrieve (e.g., under vacuum) the parked transaction T1 from above the user station and deliver the carrier to IZ2. See. FIG. 10D.

In a further arrangement, if one transaction has a highest priority (e.g., stat immediate delivery) the system may identify all potentially conflicting transactions along the length of the path of the highest priority carrier. That is, any transaction in the queue that are slated to pass through a system component on the path of the highest priority carrier are suspended and/or moved to temporary storage locations to free the path. In this regard, the path may be cleared entirely between an origination station and a destination station. This may allow using the pneumatic carrier system to deliver high priority items (e.g., items for deliver during surgery) without delay of intervening transactions.

Figure 11:
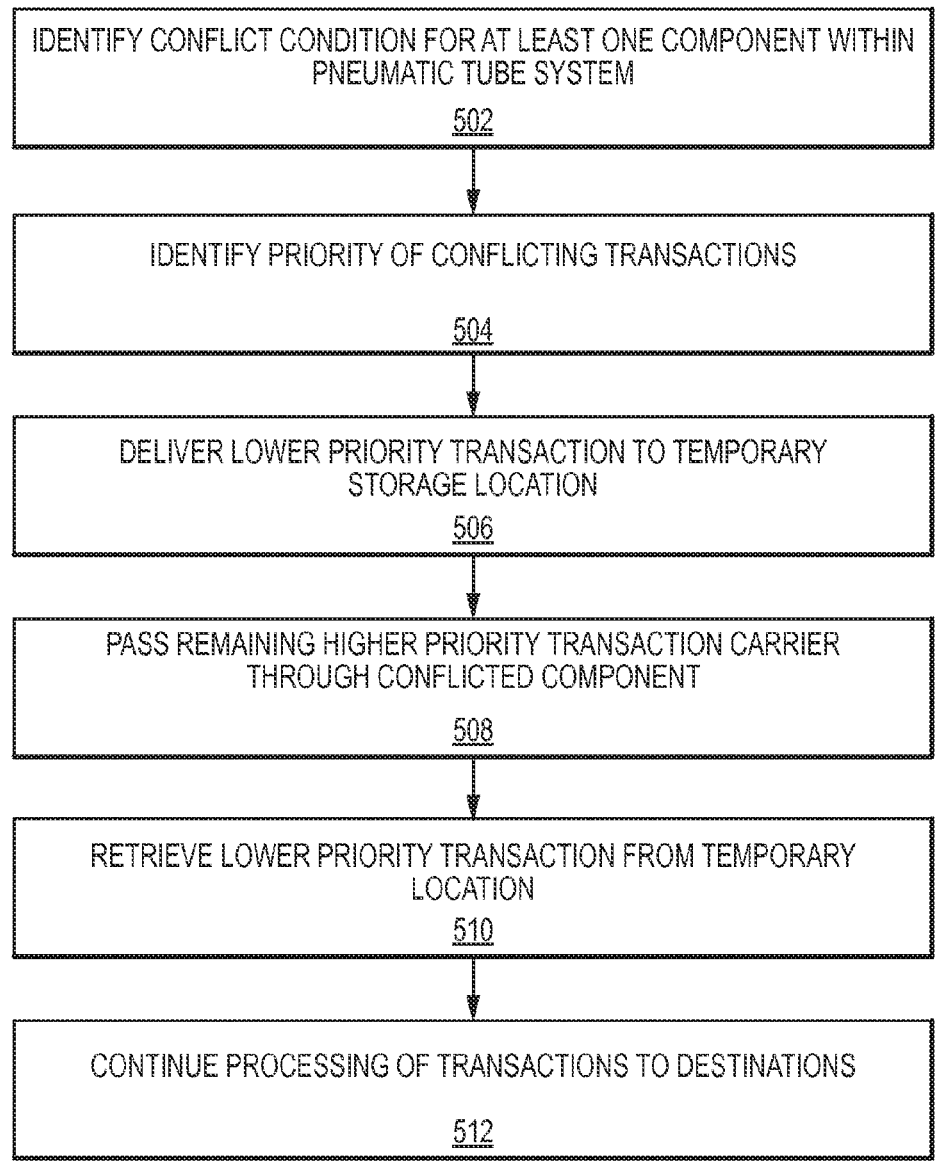
FIG. 11 illustrates a process flow sheet for a priority based conflict resolution process.

FIG. 11 illustrates a process 500 for resolving a conflict between carriers utilizing a common system component based on the priority of the carriers. Initially, a conflict is identified 502 between first and second carriers passing through a common system component. After identifying the conflict, the priority of the conflicting carriers are identified by accessing stored records for the transactions or by interrogating 504 the payloads of the carriers. By-pass locations or stations located in the zone located proximate to the conflicted system component are identified 506 for use in diverting and temporarily storing the lower priority carrier. Once such a temporary storage location is selected, the lower priority transactions is diverted 508 to the identified temporary storage location. For instance, the transaction may be parked at a slide plate above a station or the carrier may be left within in a pneumatic tube anywhere within the PV zone. The higher priority transaction is then delivered 508 through the conflicting component. Once the higher priority transaction passes through the conflicting component, the temporarily diverted carrier having the lower priority transaction is retrieved 510 and then re-launched in to the system to complete is transaction. Each transaction then proceeds 512 toward its ultimate destination.

Figure 12:
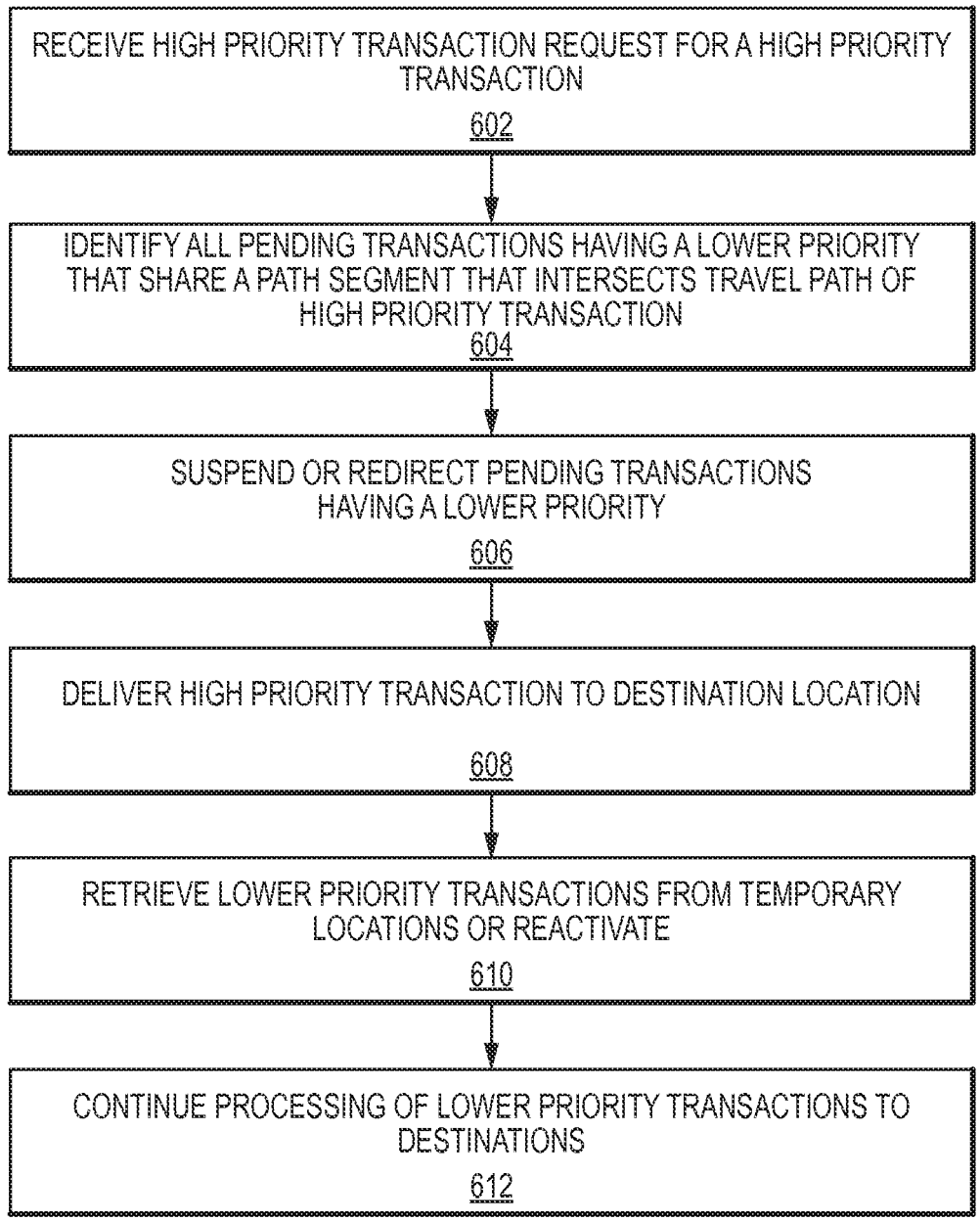
FIG. 12 illustrates a process flow sheet for an expedited delivery process.

FIG. 12 illustrates a process 600 for use in clearing the travel path of a high priority carrier. Initially, the process includes receiving a high priority transaction request 602. This high priority transaction request may be received from a user input or read from an identification device attached to a carrier or its payload. At this time, the process includes identifying 604 all pending transactions of a lower priority that have a path segment or component that is common with (e.g., intersects) the travel path of the higher priority transaction. At this time, all of the identified lower priority transactions are suspended or redirected 606 in order to clear the travel path of the higher priority transaction between its origination location and its destination location. Once these lower priority transactions are suspended or redirected, the higher priority transaction may be delivered 608 via the pneumatic carrier system to its destination location. As will be appreciated, this delivery is achieved without delay caused by intervening transactions. Once delivered, the lower priority transactions may be retrieved from their temporary storage locations and or reactivated 610 such that these lower priority transactions may be processed to their destinations 612.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such or other embodiments and with various modifications required by the particular application(s) or use(s) of the presented inventions. It is intended that the appended claims be construed to include alternative embodiments to the extent permitted by the prior art.

What is claimed:

1. A method for use in a computerized controller for operating a pneumatic carrier system comprising the steps of:
   scanning an identification device associated with a pneumatic carrier located at a first user station in a pneumatic carrier system to identify an intended recipient of a payload of said pneumatic carrier, and to identify a priority of said payload, wherein said intended recipient is identified free of a delivery location for said intended recipient;
   accessing a database record of a computer readable storage medium based on an identity of said intended recipient to identify a current location of the intended recipient;
   based on said current location of the intended recipient, identifying a travel path through said pneumatic carrier system for delivering the pneumatic carrier to a second user station proximate to said current location of the recipient via said pneumatic carrier system:
   identifying priorities of all pending carrier transactions scheduled to utilize at least one system component of said travel path;
   suspending at least one of said pending carrier transactions having a lower priority than said priority of said payload; and
   generating control signals to effect delivery of the pneumatic carrier to said second user station.

2. The method of claim 1, further comprising:
   outputting said control signal to transfer components of said pneumatic carrier system to route the pneumatic carrier through the pneumatic carrier system to said second user station.

3. The method of claim 1, wherein reading the identification device comprises:
   receiving an identification code read from said identification device; and
   accessing a database record indexed to said identification code, wherein said database record includes the identity of said intended recipient.

4. The method of claim 1, wherein receiving said information comprises:
   receiving information read from an identification element attached to said pneumatic carrier.

5. The method of claim 1, wherein receiving said information comprises:
   receiving information read from an identification element attached to a payload disposed within said pneumatic carrier.

6. The method of claim 1, wherein said intended recipient is a hospital patient and said second user station is a caregiver user station assigned to the hospital patient.

7. The method of claim 1, further comprising:
   generating a message for output at an output device associated with said second user station.

8. The method of claim 7, wherein said message identifies said intended recipient.

9. The method of claim 1, wherein receiving information comprises receiving information read from a proximity sensor.

10. The method of claim 9, wherein receiving information comprises receiving information read from a radio frequency identification (RFID) device.

\* \* \* \* \*

UNITED STATES PATENT AND TRADEMARK OFFICE
CERTIFICATE OF CORRECTION

PATENT NO.        : 9,139,383 B2                                  Page 1 of 1
APPLICATION NO.   : 14/024907
DATED             : September 22, 2015
INVENTOR(S)       : Hoganson It is certified that error appears in the above-identified patent and that said Letters Patent is hereby corrected as shown below:

In the specification
    Column 7, line 44, delete "though" and insert therefor --through--.
    Column 11, line 41, delete "though" and insert therefor --through--.
    Column 11, line 46, delete "though" and insert therefor --through--.
    Column 17, line 14, delete "deliver" and insert therefor --delivery--.

Signed and Sealed this
Eighth Day of March, 2016

Michelle K. Lee
*Director of the United States Patent and Trademark Office*